April 28, 1931.  E. T. BENNINGTON  1,802,550
MATERIAL HANDLING SYSTEM
Original Filed Feb. 2, 1929
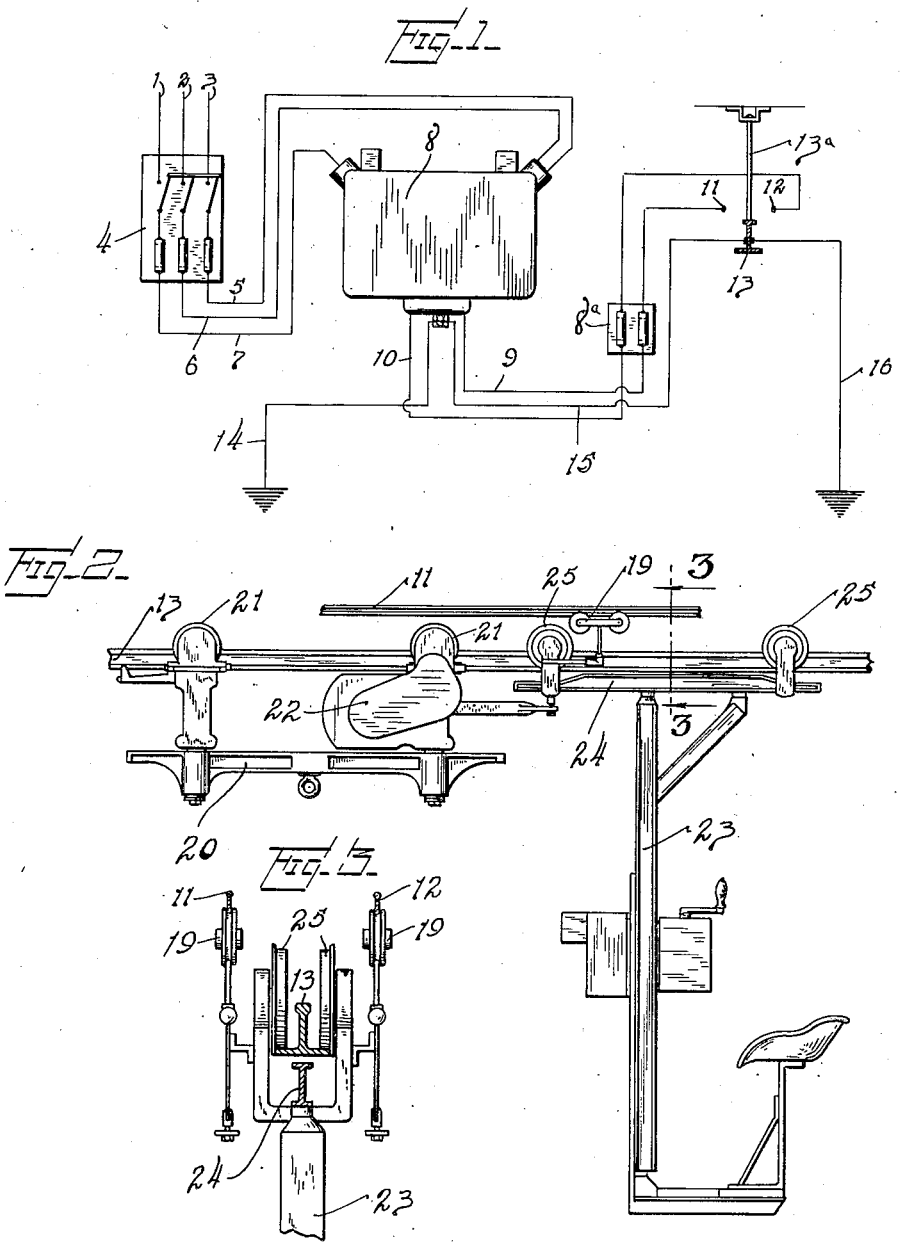
INVENTOR
Earl T. Bennington
BY
Kwis Hudson & Kent
ATTORNEYS Patented Apr. 28, 1931

1,802,550

UNITED STATES PATENT OFFICE

EARL T. BENNINGTON, OF CLEVELAND HEIGHTS, OHIO, ASSIGNOR TO THE CLEVELAND CRANE & ENGINEERING COMPANY, OF WICKLIFFE, OHIO, A CORPORATION OF OHIO

MATERIAL-HANDLING SYSTEM

Application filed February 2, 1929, Serial No. 337,138. Renewed February 16, 1931.

This invention relates to a material handling system such as an overhead monorail system, and more particularly to such a system operating on a polyphase alternating current.

In many localities a three phase alternating current is the only available power supply, and it is necessary in installing an overhead monorail system in such localities to employ either a motor generator set or a rotary converter to convert the current to direct current, or to arrange two conductor bars connected to two of the phase conductors of the power circuit on one side of the rail and one conductor bar connected to the other phase conductor of the circuit on the other side of the rail. Heretofore, the use of the motor generator sets or of the rotary converters has been preferable to the other arrangement mentioned for reasons which will later be made obvious, but such use has at the same time had the disadvantage of increasing the expense or cost of the installation. The arrangement of the two conductors on one side of the rail and a single conductor on the other side of the rail is very satisfactory, provided there are no switches used in the system which would reverse the position of the carrier on the rail and, consequently, the position of the collector trolleys carried by the carrier. However it is a desirable feature of the construction embodying the present invention to eliminate the two conductor bars on one side of the rail and the single conductor bar on the other side of the rail through which the current is supplied and employ the rail upon which the carrier travels as one of the current conductors, thus simplifying the construction considerably to the extent that one of the conductor bars previously referred to can be eliminated entirely. This arrangement however is not entirely safe unless suitable protective means is afforded. However, as most of these systems do include a number of switches, which as the carrier passes around the system will eventually result in reversing the same upon the rail and the relative position of the collector trolleys carried thereby, it is apparent that this kind of an arrangement for the system is impractical and in many instances inoperative.

The principal object of the present invention is to provide a material handling system, such as an overhead monorail system, operating on a polyphase alternating current which enables the carrier rail to be connected to one phase conductor of the circuit in a manner which is perfectly safe, and which also allows the carrier to be reversed on the rail without disturbing the operative engagement of the carrier's collector trolleys with the conductor bars connected, respectively, to the other phase conductors of the circuit.

Another object is to provide an economical installation for a monorail system operating on three phase alternating current.

Additional objects and advantages will become apparent as the description proceeds.

In its broadest aspect, the invention contemplates an overhead monorail system operating on a polyphase alternating current which receives its current supply through the provision of a polyphase transformer interposed between the main source of alternating current and the current for operating the monorail system, which transformer may function in its usual manner to step down or step up the incoming voltage or the input voltage and output voltage may be the same as the case demands. It will be readily understood therefore that by using this polyphase transformer the circuit for operating the monorail system is inductively connected to, but otherwise isolated from, the main supply circuit so that this isolated circuit may be handled entirely independently of the main supply circuit.

The invention further contemplates an overhead monorail system operating on a polyphase alternating current wherein the rail is connected to one of the phase conductors of the circuit and is also safely grounded, while the conductor bars, connected to the other phase conductors of the circuit, are so arranged as to permit the carrier and the collector trolleys carried thereby to be reversed on the rail without disturbing the operative engagement of the trolleys with the conductor bars. While it is apparent that the invention may be carried into effect in a number of different ways, a specific arrangement for such purpose will now be described by way of example.

In the accompanying drawing

Fig. 1 is a diagrammatic showing of one way in which a three phase alternating current may be used with an overhead monorail system;

Fig. 2 is a side elevational view of a carrier arranged on a system such as is shown in Fig. 1, and Fig. 3 is a sectional view taken on line 3—3 of Fig. 2.

It is not possible to adequately insulate the rail from its supports because the stresses occasioned in such rail by the weight of the carrier and the material carried thereby would soon break down and destroy such insulation. Accordingly, were the rail itself simply connected to one of the phase conductors of the power circuit, serious accidents would, in all probability, result. Not only the rail, but also the entire structure within which the rail is arranged would be charged, as well as the carrier itself and the operator's cab or platform usually carried thereby. It is, therefore, essential that adequate means be provided which renders safe the use of the rail as a conductor.

The leads 1, 2 and 3 connected to the different phase conductors of a three phase alternating power circuit for both the hoist and propulsion motors are shown as connected to a suitable switch 4 from which the leads 5, 6 and 7 pass to a transformer 8 for stepping down the voltage, if necessary, of the current. The phase conductors 9 and 10 of the secondary power circuit extend from the transformer 8 to a fuse block 8ª and are then connected to the conductor bars or trolley wires 11 and 12, respectively; one of said bars being arranged on one side of the overhead rail 13 and the other on the other side of the rail at equal distances therefrom. The overhead rail 13 is supported in a well-known manner from the structure in which the system is installed by means of a plurality of hangers 13ª. The casing of the transformer 8 forms a portion of the remaining phase conductor of the secondary power circuit and is grounded by a lead 14 extending from the casing to the ground. The casing is also connected to the rail 13 by a conductor 15 which forms the remaining phase conductor of the secondary power circuit. It should be understood that the casing being grounded is a practical advantage as it insures a proper ground connection from the secondary circuit, but the important object behind this is to provide a ground connection in that part of the circuit between the secondary windings of the transformer and the rail. The arrangement thus far set forth constitutes a complete and operative one and it would be possible to safely install and operate such a system.

The carrier could be constructed in any well-known manner and would have a collector trolley adapted to engage the conductor bar 11 and a collector trolley adapted to engage the conductor bar 12, wherefore the three phase power circuit would be complete and is traced through the phase conductors 9 and 10 to the conductor bars 11 and 12, through the carrier, the rail, the lead 15 to the transformer casing and the ground lead 14. This arrangement would substantially obviate the danger of the structure or building within which the system was installed becoming charged by the current passing through the rail, since such current would follow the course just above outlined, which presents the best path of least resistance for the current. Of course a certain amount of the current would pass through the building but this amount would be negligible since the relative resistances of the building and the ground 14 would be so widely disposed. However, in order to further insure against any danger of the building becoming charged and to further increase the discrepancy between the relative resistances of the ground connection and the building, it is contemplated to provide a direct ground connection for the rail, such as that furnished by the lead 16 extending from the rail to the ground. This second and direct ground connection for the rail will also be advantageous in case the ground connection from the transformer casing is broken, while should the ground 16 be broken there would still remain the ground connection 14 from the transformer casing.

In order to more clearly illustrate the invention a carrier 20 having collector trolleys 19 associated therewith is shown in Figs. 2 and 3 as supported from the wheels 21 traveling on the rail 13. The carrier is propelled by means of an electric motor 22, preferably of the slip-ring induction type, connected through suitable gearing to the adjacent pair of wheels 21 or to any other suitable traction wheels. An operator's platform 23 may be connected directly to the carrier, as shown, or it may be connected to a separate platform carrier 24, supported from wheels 25 traveling on the rail, and operatively associated with the carrier 20. The collector trolleys 19 each preferably comprise a pair of rollers mounted in a bracket which is suitably supported by either the carrier or the platform carrier; the latter arrangement being the one illustrated. Of course it is understood that suitable connections are provided between the trolleys 19 and the motor 22 as well as the trolleys and a hoist motor (not shown), and that the trolleys are arranged on opposite sides of the rail so that one engages the conductor bar 11 and the other the conductor bar 12. It quite naturally follows that the location of a trolley and conductor bar on each side of the rail eliminates all danger of the trolleys becoming so positioned through reversal of the carrier on the rail as to be out of engagement at any time with a conductor bar. It should be understood that the carrier shown and described herein is illustrative only and that any form of carrier might be adapted for use with the system shown in Fig. 1.

Where in the claims the term "transformer" is used it is to be understood that its use includes the usual feature of a transformer in stepping up or stepping down the incoming voltage and also where the input voltage is the same as the output voltage.

It should further be understood that the invention is not to be limited to the arrangement shown in Fig. 1, but may be embodied in a variety of arrangements falling within the scope of the appended claims.

Having thus described my invention, I claim:

1. In an overhead monorail system, a source of polyphase alternating current, a rail upon which a carrier may travel, conductor bars arranged adjacent to the rail so as to be operatively engaged by the collector trolleys associated with the carrier, said conductor bars and said rail being inductively connected with said source of current, and a ground connection from said rail.

2. In an overhead monorail system, a source of polyphase alternating current, an induction device having primary and secondary windings, the primary windings of which are connected with said source of current, a rail upon which a carrier may travel, conductor bars arranged adjacent to the rail so as to be operatively engaged by the collector trolleys associated with the carrier, said conductor bars and said rail being connected with the secondary windings of said induction device, and a ground connection from said rail.

3. In an overhead monorail system, a source of polyphase alternating current, a transformer the primary windings of which are connected with said source of current, a rail upon which a carrier may travel, conductor bars arranged adjacent to the rail so as to be operatively engaged by the collector trolleys associated with the carrier, said conductor bars and said rail being connected to the secondary windings of said transformer, and a ground connection from said rail.

4. In an overhead monorail system, a source of polyphase alternating current, a transformer the primary windings of which are connected with said source of current, a rail upon which a carrier may travel, conductor bars arranged adjacent to the rail so as to be operatively engaged by the collector trolleys associated with the carrier, said conductor bars and said rail being connected to the secondary windings of said transformer, said rail being grounded at a plurality of points.

5. In an overhead monorail system, a source of polyphase alternating current, a transformer the primary windings of which are connected with said source of current, a rail upon which a carrier may travel, conductor bars arranged adjacent to the rail so as to be operatively engaged by the collector trolleys associated with the carrier, said conductor bars being connected to different phase conductors of the secondary windings of said transformer, said rail being connected to another phase conductor of said secondary windings of said transformers, and a ground connection from said phase conductor connected to said rail.

6. In an overhead monorail system, a source of polyphase alternating current, a transformer the primary windings of which are connected with said source of current, a casing for said transformer, a rail upon which a carrier may travel, conductor bars arranged adjacent to the rail so as to be operatively engaged by the collector trolleys associated with the carrier, said conductor bars being connected to different phase conductors of the secondary windings of said transformer, said rail being connected to another phase conductor of the secondary windings of said transformer which conductor is also electrically connected with said casing, a ground connection from said rail, and a ground connection from said casing.

7. In an overhead monorail system, a source of polyphase alternating current, a transformer the primary windings of which are connected with said source of current, a rail upon which a carrier may travel, conductor bars arranged adjacent to the rail so as to be operatively engaged by the collector trolleys associated with the carrier irrespective of the reversal of the carrier upon the rail, said conductor bars and said rail being connected to the secondary windings of said transformer, and a ground connection from said rail.

In testimony whereof, I hereunto affix my signature.

EARL T. BENNINGTON.